United States Patent [19]

Ninnemann et al.

[11] Patent Number: 4,627,025

[45] Date of Patent: Dec. 2, 1986

[54] MEMORY PROGRAMMABLE CONTROLLER WITH WORD AND BIT PROCESSORS

[75] Inventors: Peter Ninnemann, Rottenbach; Dieter Wollscheid, Erlangen, both of Fed. Rep. of Germany

[73] Assignee: Siemens Aktiengesellschaft, Munich, Fed. Rep. of Germany

[21] Appl. No.: 568,105

[22] Filed: Jan. 4, 1984

[30] Foreign Application Priority Data

Jan. 28, 1983 [DE] Fed. Rep. of Germany ....... 3302940

[51] Int. Cl.⁴ .................... G06F 15/16; G06F 15/46
[52] U.S. Cl. ................................. 364/900; 364/131
[58] Field of Search ... 364/200 MS File, 900 MS File, 364/131, 132, 136

[56] References Cited

U.S. PATENT DOCUMENTS

| 3,921,146 | 11/1975 | Danco | 364/900 |
| 3,942,158 | 3/1976 | Dummermuth | 364/900 |
| 4,165,534 | 8/1979 | Dummermuth | 364/900 |
| 4,172,289 | 10/1979 | Struger | 364/900 |
| 4,212,076 | 7/1980 | Conners | 364/706 |
| 4,215,399 | 6/1980 | Pavicic | 364/101 |
| 4,251,883 | 2/1981 | Grants | 371/29 |

Primary Examiner—Archie E. Williams, Jr.
Attorney, Agent, or Firm—Kenyon & Kenyon

[57] ABSTRACT

A memory-programmable controller of the multiprocessor type, has both a fast bit processor for processing bit oriented operations and a slower word processor for processing word oriented operations. The bit and word operations are stored in a user program memory by the user. These operations are the program which controls the peripheral process controlled by the controller. The bit processor reads the user program memory and sequentially stops when a word command is recognized. The bit processor furnishes information which the word processor uses as the entry address for a program routine associated with the word command in an operating system memory. This provides freedom in the choice of the word processor and in the design of the bit processor to a high degree.

5 Claims, 4 Drawing Figures

MEMORY PROGRAMMABLE CONTROLLER WITH WORD AND BIT PROCESSORS

CROSS REFERENCE TO RELATED APPLICATIONS

This application is related to the following U.S. Patent Applications, each of which was filed on even date herewith and assigned to the assignee of the present application:

MEMORY-PROGRAMMABLE CONTROLLER, filed as Ser. No. 568,107 on Jan. 24, 1984 in the name of Dieter Wollscheid, and claiming priority of German Application No. P33 23 824.3 filed July 1, 1983;

MEMORY-PROGRAMMABLE CONTROLLER filed as Ser. No. 568,104 on Jan. 24, 1984 in the names of Peter Ninnemann and Dieter Wollscheid, and claiming priority of German Application No. P33 02 902.4 filed Jan. 28, 1983;

MEMORY-PROGRAMMABLE CONTROLLER, filed as Ser. No. 568,106 on Jan. 24, 1984 in the names of Peter Ninnemann and Dieter Wollscheid, and claiming priority of German Application No. P33 02 929.6 filed Jan. 28, 1983;

MEMORY-PROGRAMMABLE CONTROLLER, filed as Ser. No. 568,115 on Jan. 24, 1984 in the names of Dieter Wollscheid, Peter Ninnemann, Siegfried Stoll and Waldemar Wenzel, and claiming priority of German Application No. P33 02 909.1 filed Jan. 28, 1983.

The disclosures of each of the above applications is hereby incorporated by reference.

BACKGROUND OF THE INVENTION

The present invention relates to the field of memory programmable controllers of the type having cyclically traversed user control programs which operate on process images stored in a data memory of the controller. The process images once the control program has executed a full cycle, are used to control a peripheral process. In particular, the present invention relates to memory-programmable controllers of the multiprocessor type including a word processor which processes operating system and word commands, a bit processor which processes binary interlinking commands, a user program memory in which the control program is stored, an operating system memory in which an operating system program is stored and a data memory wherein the binary process images of the peripheral process under control are stored.

Memory-programmable controllers are described in detail, for instance, in Siemens Zeitschrift Energietechnik 1979, no. 2, pages 43 to 47, in no. 4, pages 136 to 139, in European Patent No. 10170 and in U.S. Pat. Nos. 3,921,146 and 3,942,158.

Presently popular microprocessors, called word processors in the following because they process data in parallel groupings called words, are as a rule designed, as far as their command sets are concerned, for a broad group of users, i.e., universally. In the course of development, the size and performance of the command sets are increasing steadily. It is also characteristic of this development that more and more information carriers (bits) are combined and processed in parallel, i.e., in word groups, e.g. 8 bits in a word.

There are, however, special applications in which largely information one bit wide must be processed. One bit, for instance, independently of others, may carry information on peripheral process conditions, such as whether a switch is "on" or "off", or whether controlled process input conditions are met or not met.

A memory-programmable controller of the type mentioned above should preferably be able to carry out bit operations, i.e., logical interlinking of data one bit wide, as well as more complex functions with data one word wide, such as arithmetic functions, data transfer, timing etc.

It is therefore advantageous to use within the scope of a memory-programmable controller a multiprocessor system, in which the execution of one bit binary commands is assigned to a separate fast bit processor, while a relatively slow word processor carries out the more complex functions involving words (see, for instance, Siemens-Zeitschrift Energietechnik 1980, no. 9, page 361).

Since the word-wide and bit-wide processing of the data is mixed and in part independent of the other, a special arrangement for coupling and synchronizing the processors is required. It must also be taken into consideration that the word processor must additionally execute special routines at definite intervals as well as operate completely asynchronously to the program cycle proper, e.g., word and bit operations. Additionally, the program cycle proper with bit- and word-wise data processing should be loaded as little as possible by these routines, but should have the lowest priority, i.e., as soon as the processing of one of these special routines is required, the latter must be performed immediately and unconditionally.

SUMMARY OF THE INVENTION

It is an object of the present invention to provide a coupling and synchronization arrangement of the two processors in a memory programmable controller, and especially one which is largely independent of the type of word processor.

These and other objects of the present invention are achieved in a memory programmable controller of the type having a cyclically traversed user control program for controlling a peripheral process including a word processor for processing operating system and word commands, a bit processor for processing binary interlinking commands, a user program memory wherein the control program including the word and interlinking commands is stored, an operating system memory wherein an operating system program comprising a plurality of subroutines including the operating systems commands is stored, some of the operating system commands associated with the word commands, each of the subroutines having an entry address, and a data memory wherein binary process image signals are stored, the improvement comprising:

that the bit processor sequentially accesses the user program memory and recognizes word commands and interlinking commands in the user program memory, and halts its own operation in response to the recognition of a word command; and further comprising that a generator for generating digital information corresponding to an entry address into a subroutine of the operating system program associated with the recognized word command, is provided whereby the word processor can enter the subroutine at the entry address and execute the subroutine associated with the recognized word command.

In a preferred embodiment, the generator for generating comprises a mapping memory for generating the entry addresses corresponding to the respective word commands from the digital information and the bit processor operates so as to produce an addressing signal when the bit processor is processing a binary interlinking command, the addressing signal being coupled to the mapping memory the mapping memory being responsive to the addressing signal and generating an entry address for a subroutine in the operating system memory which continuously interrogates the mapping memory, the bit processor producing, when a word command in the user program memory is recognized, the digital information, the mapping memory being responsive to the digital information and generating the entry address of a subroutine in the operating system program associated with the recognized word command, the word processor being responsive to the entry address and entering into the operating system program at the entry address and executing the subroutine associated with the recognized word command, the bit processor further halting all of its processing operations until the subroutine is executed.

Likewise, the bit processor addresses, when a stopping point in the control program is reached, that address in the mapping memory in which the entry address is located at which a subroutine for processing the stopping point in the operating system of the word processor begins.

In the above-mentioned manner it is achieved that, for a fixed command code of the word operation in the user program memory, the entry addresses of the corresponding program subroutines can be kept variable.

BRIEF DESCRIPTION OF THE DRAWINGS

The present invention will be explained in greater detail in the following detailed description, with reference to the drawings, in which.

DETAILED DESCRIPTION

Figure 1:
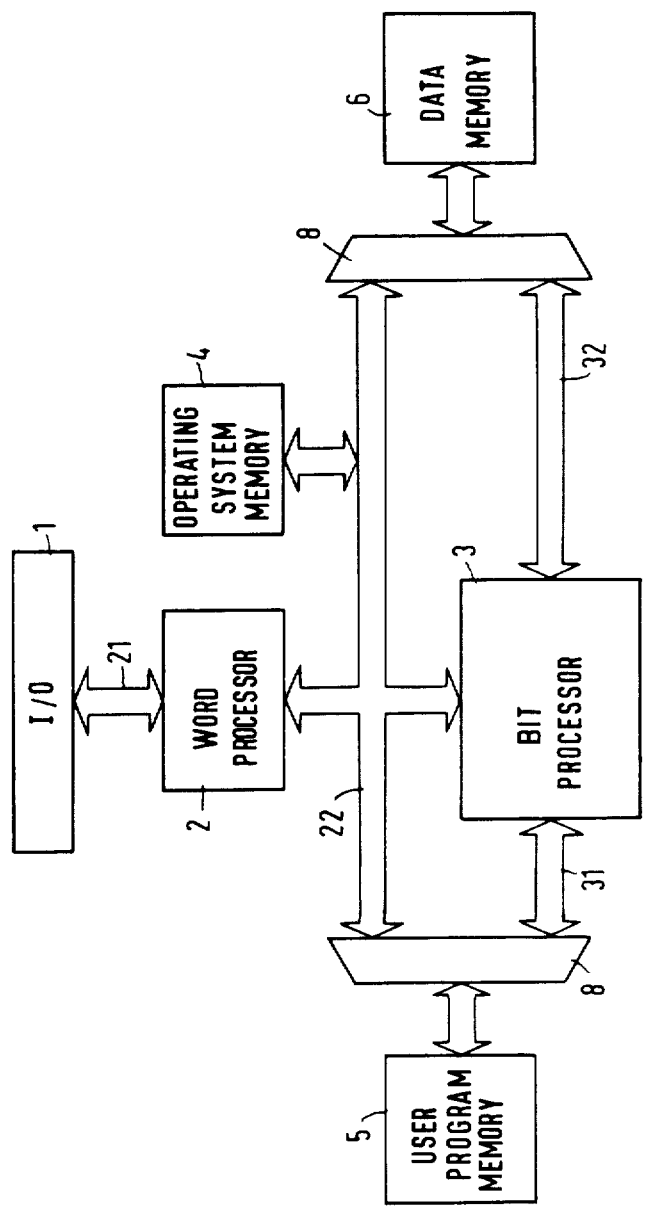
FIG. 1 is a block diagram of one embodiment of the memory-programmable controller according to the invention.

With reference now to the drawings, the block diagram of one embodiment of a multiprocessor controller according to the invention is shown in FIG. 1. The execution of binary commands is assigned to a separate fast bit processor 3, while a relatively slow word processor 2 carries out more complex functions, involving groups of parallel data, i.e., words. The word processor 2 is coupled to a peripheral bus 21 to which the input and output modules 1 are coupled. The input and output modules interface with the process under control. An internal system bus 22 is coupled to an operating system memory 4 and via data switch 8, to data memory 6 wherein the process image is stored and to user program memory 5 wherein the control program is stored. The bit processor 3 is also connected to the same bus 22 which, via buses 31 and 32 exclusively dedicated to the bit processor and data switches 8, has access to user program memory 5 and data memory 6. Data communication with the peripheral process always occurs by way of the word processor 2 which always stores at the control program cycle limits the state of all input information from the process in the internal data memory 6 and transmits the output signals resulting from the logical interlinking in the data memory 6 to the peripheral process at the end of the control program cycle. While the control program is running, the controller therefore does not operate directly with the actual signals of the peripheral process, but rather with internal process images stored in the data memory 6 (see, for instance, European Patent No. 10170 and U.S. Pat. Nos. 3,942,158 and 3,921,146).

The instructions regarding both bit and word operations are encoded in a special programming language and stored in the user program memory 5. These instructions are executed by the bit processor 3 and indirectly by word processor 2 under the control of an operating system program 2 stored permanently in the operating system memory 4 of the word processor 2 in the language of the microprocessor used.

In the following, a coupling arrangement will be described which meets the requirements mentioned above, i.e., the common execution of a special programming language by both a word and bit processor, and permits a universal design of the bit processor 3, i.e. independent of the type of word processor 2 coupled thereto.

It is characteristic of the overall system that in principle the word processor 2, as a standard microprocessor, and the bit processor 3, each have program counters of their own and at first can operate completely independently of each other and asynchronously.

The bit processor 3 itself appears to the word processor 2 like a memory interface or an intelligent peripheral module. It has internal registers, from which the word processor 2 can at any time determine the instantaneous status of the bit processor such as "RUN" or "STOP". Through write access to one of these registers, the bit processor 3 furthermore can be started or stopped by the word processor 2 at any time.

The program counter for keeping track of the actual program cycle is located in the bit processor 3. After it has been started, the bit processor 3 fetches instructions D from the user program memory 5 and determines whether they are word or bit operations. After a bit operation is recognized, the bit processor executes it immediately itself. If a word operation is recognized, the bit processor transfers the word operation to the word processor 2 and goes automatically to the status "STOP".

The bit processor 3 itself is not capable of accessing or controlling the word processor 2. It merely prepares in its internal registers information for the word processor 2. The control of the overall system must therefore start from the word processor 2. It is achieved by this principle that the bit processor need not be tailored to a specific type of word processor, but can be kept general at its interface and can be handled by any standard microprocessor like a memory or an intelligent peripheral module.

Figure 2:
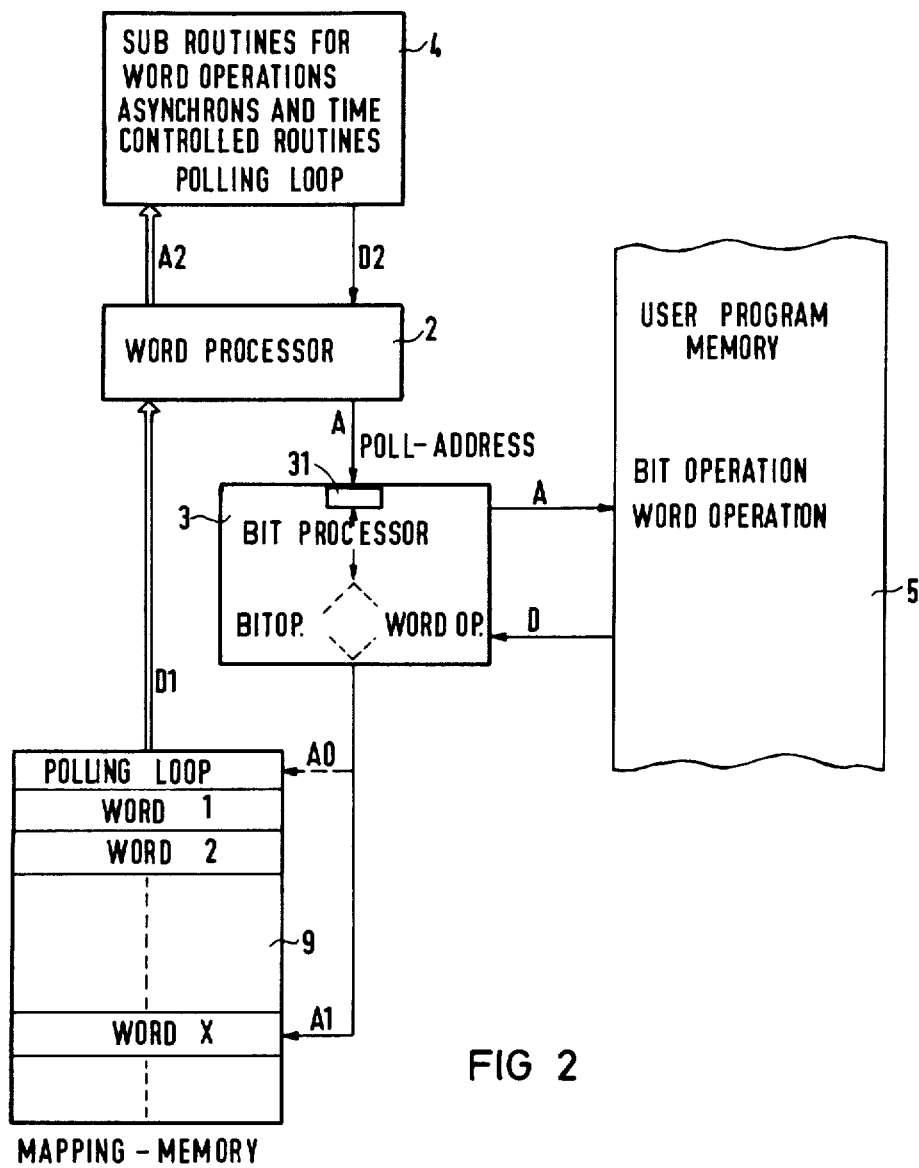
FIG. 2 is a block diagram of the coupling arrangement between the word processor and the bit processor.

As may be seen from FIG. 2, the tasks of the bit processor 3 are therefore to fetch command D in the user program memory 5 at the address A of the program counter of the bit processor and to recognize the type of command (word or bit operation) and to react accordingly. This means that in the case of bit operations, the latter are executed by the bit processor, while if a word operation is recognized, it is transferred to the word processor 2, whereupon the bit processor subsequently stops and waits for a new start by the word processor. The tasks of the word processor 2 include executing certain routines which may be asynchronous or time-controlled, and additionally, controlling the bit processor 3 when executing word operations recognized by the bit processor in special program routines.

Each word operation is interpreted by a special program routine through the word processor 2. The entry address into the program routine associated with a given operation is not obtained by the word processor 2 directly from the code of the word operation in the user program memory 5, but preferably from an interposed mapping memory 9. The code of the word operation forms the address A1 for a given memory cell of the memory 9, from which the entry address is generated or mapped into the corresponding program routine as the data D1. In processing this program routine, the word processor can then access further data in the user program memory, such as parameters or operands associated with the word command. It is achieved in this manner that, with a fixed command code of the word operation, the entry addresses of the associated program routines can be kept variable.

As indicated, the synchronization between the word and the bit processor is performed by the control signal STOP/START of the bit processor. The program counter of the bit processor 3 can be read and written into by the word processor 2. If the program counter has been written into by the word processor with a defined value, the bit processor 3 then is started. The bit processor 3 starts up freely and assumes the above-mentioned tasks. In the meantime, the word processor 2 processes either routines coming up parallel to the bit processor 3 or is in an active "polling loop" (see FIG. 3) in which it merely addresses two successive 8-bit registers 31 of the bit processor 3, (see FIG. 2) whereupon these registers 31 of the bit processor 3 address the mapping memory 9 in such a way that the latter puts data D1 on the data bus which correspond to the type of the word operation. These data are interpreted as a 16-bit address A2, into which the word processor 2 is then branched. This address A2 is either the entry address for one of the program routines in the operating system memory for word operations or the start of the inactive polling loop itself.

As long as no word operation is recognized by the bit processor 3, the registers 31 normally furnish, when addressing the mapping memory, the base address A0 of the mapping memory 9, i.e., the entry or starting address of the polling loop. If the bit processor 3 detects a word operation in the user program memory 5, it connects the code of the word operation as the address A1 to the mapping memory 9 via the correspondingly changed registers 31, and the word processor reads in its loop, determined by the address of the above-mentioned registers, the data D1 of the memory cell of the mapping memory 9 addressed by the bit processor 3, i.e., the entry address A2 into the program routine D2 for this word operation in the operating system memory 4. The word processor 2 therefore always branches off to where the address in the bit processor in the above-mentioned registers 31 point, i.e., to the start of the polling loop or to one of the program routines.

After a word operation is recognized, the bit processor 3 stops and must be restarted at the end of the respective program routine of the word processor for the word operation by the word processor 2. Since the program counter in the bit processor 3 is incremented after every complete fetch of an instruction, it already receives the correct continuation address for further cycling through the user program memory 5. If the word operation was a jump command, the word processor must reload the program counter of the bit processor 3 after it is restarted, with the jump destination.

The polling loop of the word processor 2 includes, in popular microprocessors, about 2 to 4 commands: Address register of the bit processor, and Jump to the address read from the memory 9. An extremely short reaction time is thereby achieved in recognizing word operations.

In addition, the mapping memory 9 makes software-wise branching via a list unnecessary and again, processing time is saved.

Figure 3:
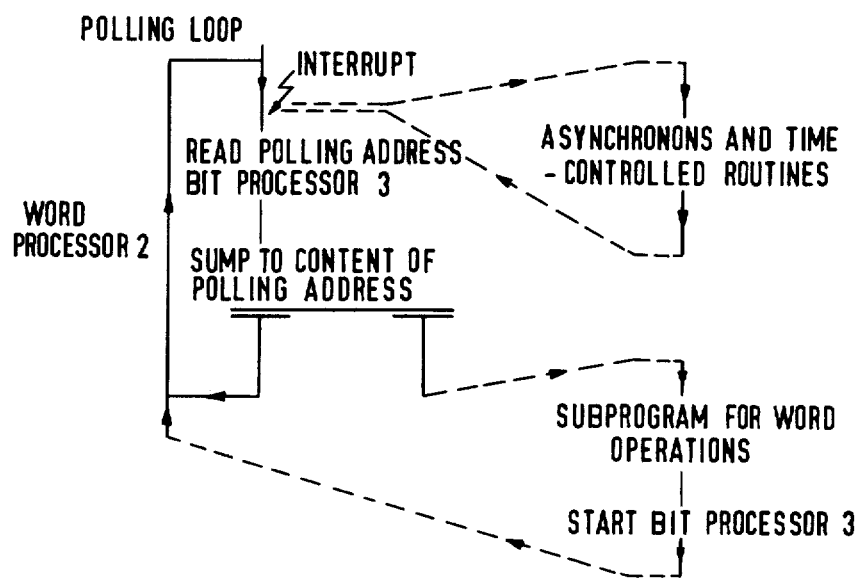
FIG. 3 is a flow chart of the command cycle in the word processor.

During the processing of bit operations, the word processor 2 can jump via "interrupts" from its polling loop into the asynchronously or time-controlled routines already mentioned and these can operate in parallel with the bit processor, as is also seen from FIG. 3. If the bit processor then recognizes a word operation, actual execution of these routines continues only until the word processor 2 has returned to its polling loop and can process the word operation.

Figure 4:
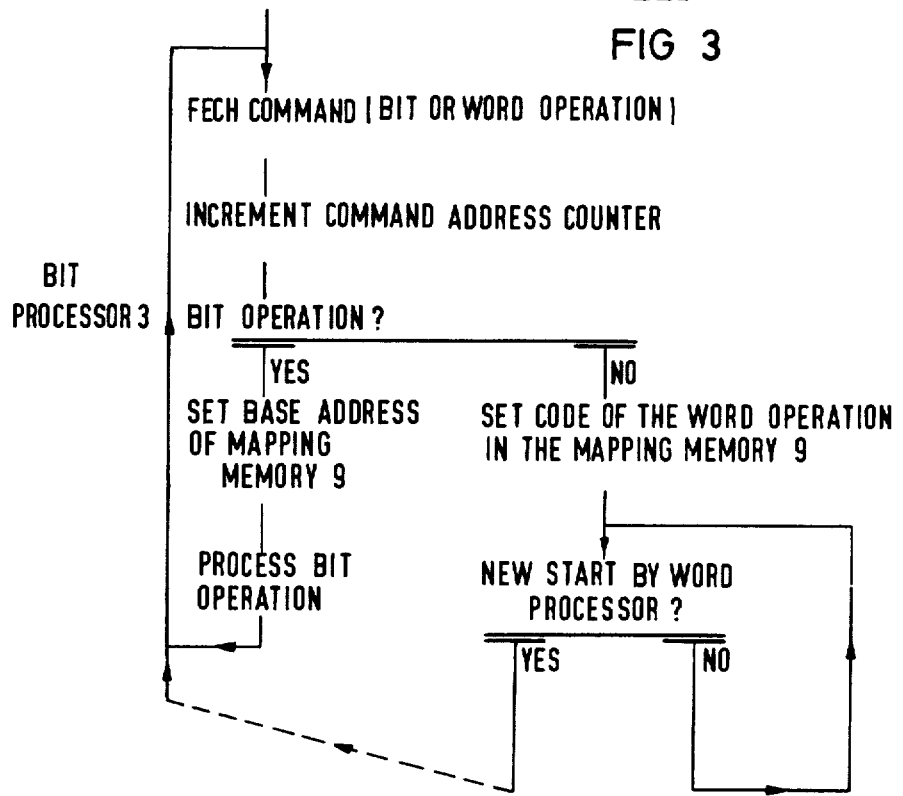
FIG. 4 is a flow chart of the command cycle in the bit processor.

The operation of the word and bit processors as described above are summarized in the flow charts of FIGS. 3 and 4.

Besides the fast reaction times, some of the main advantages of the present coupling arrangement are the simple synchronization between the word and bit processors, the possible parallel operation of both processors and the independence of the bit processor design of the type of word processor. The interface to the bit processor is realized as a memory interface and is free of any additional control lines. However, a less costly and instead somewhat less capable solution is also possible. The memory 9 may be omitted. The memory content which transforms the information specifying the type of the word command to the entry address in the program section of the word command, is then within the memory 4 in a constant-data field. The word processor 2 reads in the bit processor only that information which indicates whether a word command occurred, which word command is present and whether a stopping point was reached. The required entry address is then determined for each program through access to the table, i.e., the data field.

It is also possible to dispense with recoding the information through memories and have the word processor 2 use the information from the bit processor 3 directly as the entry address, or thereby form this address by logical or arithmetic operations such as masking, shifting or adding etc.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. In a memory-programmable controller of the type having a cyclically traversed user control program for controlling a peripheral process including a word processor for processing operating system and word commands, a bit processor coupled to the word processor for processing binary interlinking commands, a user program memory coupled to said word processor and said bit processor and wherein the control program including the word and interlinking commands is stored, an operating system memory coupled to said word processor and said bit processor and wherein an operating system program comprising a plurality of subroutine including the operating system commands is stored, some of the operating system commands comprising subroutines for executing the word commands, each of the subroutines having an entry address, and a data memory coupled to said word processor and said bit processor and wherein binary process image signals comprising input and output signals of the process are stored, the improvement comprising:

said bit processor comprising means for sequentially accessing the user program memory and for recognizing word commands and interlinking commands in the user program memory, the operation of said bit processor being stopped in response to a word command recognized by the bit processor; and further comprising means responsive to a word command recognized by the bit processor for generating digital information corresponding to an entry address into a subroutine of said operating system program for executing the recognized word command, said digital information being supplied to the word processor whereby the word processor can enter the subroutine at the entry address corresponding to the digital information and execute the subroutine corresponding to the recognized word command said means for generating comprising mapping memory means for generating the entry addresses corresponding to the respective word commands from the digital information, said bit processor comprising means for producing an addressing signal when the bit processor is processing a binary interlinking command, the addressing signal being coupled to the mapping memory means, the mapping memory means being responsive to the addressing signal and generating an entry address for a subroutine in the operating system memory which continuously interrogates said mapping memory means, the means for producing further producing, when a word command in the user program memory is recognized, the digital information, the mapping memory means being responsive to the digital information and generating the entry address of a subroutine in said operating system program corresponding to the recognized word command, the word processor being responsive to the entry address and entering into the operating system program at the entry address and executing the subroutine corresponding to the recognized word command, all processing operations of the bit processor being halted until the subroutine is executed.

2. The improvement recited in claim 1 wherein the user control program includes a stop command, the means for producing addressing the mapping memory means in response to the stop command, the mapping memory means generating the entry address in the operating system memory for processing the stop command, the word processor entering the entry address in the operating system memory in response thereto.

3. The improvement recited in claim 1 wherein said means for generating comprises register means, said digital information further corresponding to a recognized word command or interlinking command, said digital information being stored in the register means, the register means being accessible to the word processor for indicating to the word processor the type of command read from the user program memory by the bit processor, said operating system memory including a portion thereof corresponding to said digital information having said entry addresses stored therein, said word processor including means for reading said portion corresponding to said digital information to determine said entry address.

4. The improvement recited in claim 1 wherein the entry address is identical to the digital information.

5. The improvement recited in claim 1 wherein the means for generating comprises logic circuit means for generating the entry address from the digital information.

* * * * *